US009392443B2

(12) United States Patent
Roberts

(10) Patent No.: US 9,392,443 B2
(45) Date of Patent: Jul. 12, 2016

(54) SHARED SECRET FOR WIRELESS DEVICES

(71) Applicant: Empire Technology Development LLC, Wilmington, DE (US)

(72) Inventor: Michael John Roberts, Jamberoo (AU)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/448,267

(22) Filed: Jul. 31, 2014

(65) Prior Publication Data

US 2016/0037336 A1    Feb. 4, 2016

(51) Int. Cl.
*H04L 9/14* (2006.01)
*H04W 12/02* (2009.01)
*H04L 9/08* (2006.01)

(52) U.S. Cl.
CPC ............... *H04W 12/02* (2013.01); *H04L 9/088* (2013.01); *H04L 9/14* (2013.01); *H04L 2209/24* (2013.01)

(58) Field of Classification Search
CPC ......... H04L 67/18; H04L 41/12; H04L 67/42; H04L 9/14; H04L 9/088; H04L 2209/24; H04W 12/02; H04M 3/4228; H04M 3/42357; H04M 3/5322; H04M 2201/18; H04M 2203/2044
See application file for complete search history.

(56) References Cited

U.S. PATENT DOCUMENTS

| 8,320,934 | B2 | 11/2012 | Sheynblat |
| 2008/0146205 | A1* | 6/2008 | Aaron .................. 455/414.2 |
| 2009/0052663 | A1* | 2/2009 | Hammond et al. ............ 380/44 |
| 2011/0117272 | A1 | 5/2011 | Nielsen et al. |
| 2012/0133553 | A1* | 5/2012 | Schmidt-Karaca et al. .................. 342/357.25 |
| 2013/0236007 | A1* | 9/2013 | Munro et al. ................... 380/44 |
| 2013/0268758 | A1 | 10/2013 | Schrecker |
| 2014/0258295 | A1* | 9/2014 | Wang et al. .................. 707/737 |

OTHER PUBLICATIONS

"Calculating centres of mass," Engineering Mathematics: Open Learning Unit Level 1, 15.3: Applicants of Integration, pp. 1-44, (1999). 44 pages.*
Ajwani, D. et al., "On Computing the Centroid of the Vertices of an Arrangement and Related Problems," Algorithms and Data Structures, Lecture Notes in Computer Science, vol. 4619, pp. 519-528 (2007).
"Calculating Mesh Volume Centroid," Accessed at http://web.archive.org/web/20130515002859/http://wiki.mcneel.com/developer/scriptsamples/meshvolumecentroid, Accessed on Jul. 7, 2014, p. 1.
"Geometric Centroid," Accessed at http://web.archive.org/web/20140701225854/http://mathworld.wolfram.com/Geometric-Centroid.html, Accessed on Jul. 7, 2014, pp. 3.
"Calculating centres of mass," Engineering Mathematics: Open Learning Unit Level 1, 15.3: Applications of Integration, pp. 1-44 (1999).

(Continued)

*Primary Examiner* — Don Zhao
(74) *Attorney, Agent, or Firm* — Brundidge & Stanger, P.C.

(57) ABSTRACT

In some examples, a device may include a communication interface configured to exchange signals with another device, and a computing component configured to autonomously calculate a centroid of a plurality of devices of which the device is a part, based at least in part on relative distances between the device and others of the plurality of devices and relative distances among the others of the plurality of devices, and autonomously establish the centroid as a shared secret.

18 Claims, 7 Drawing Sheets

(56) References Cited

OTHER PUBLICATIONS

Sharma, N. K., "A weighted center of mass based trilateration approach for locating wireless devices in indoor environment," Proceedings of the 4th ACM international workshop on Mobility management and wireless access, pp. 112-115 (2006).

Laurendeau, C. and Barbeau, M., "Centroid Localization of Uncooperative Nodes in Wireless Networks Using a Relative Span Weighting Method," EURASIP Journal on Wireless Communications and Networking, vol. 2010, pp. 9 (2010).

Hernandez, O. et al., "Position Location Monitoring Using IEEE® 802.15.4/ZigBee® technology," freescale.com/beyondbits, Accessed on Jul. 7, 2014, pp. 66-73.

Zhang, D. et al., "DV-Hop localization algorithms based on centroid in wireless sensor networks," 2nd International Conference on Consumer Electronics, Communications and Networks, pp. 3216-3219 (2012) http://ieeexplore.ieee.org/xpl/login.jsp?tp=&arnumber=6201891&url=http%3A%2F%2Fieeexplore.ieee.org%2Fxpls%2Fabs_all.jsp%3Farnumber%3D6201891 31.00, Date of Conference: Apr. 21-23, 2012.

* cited by examiner

US 9,392,443 B2

SHARED SECRET FOR WIRELESS DEVICES

TECHNICAL FIELD

The embodiments described herein pertain generally to secure communication among devices.

BACKGROUND

Unless otherwise indicated herein, the approaches described in this section are not prior art to the claims in this application and are not admitted to be prior art by inclusion in this section.

The proliferation of intelligent embedded devices has changed the landscape of communications within a system. However, inter-device communications depend on effective security mechanisms.

SUMMARY

In one example embodiment, a device may include a communication interface configured to exchange signals with another device, and a computing component configured to autonomously calculate a centroid of a plurality of devices of which the device is a part, based at least in part on relative distances between the device and others of the plurality of devices and relative distances among the others of the plurality of devices, and autonomously establish the centroid as a shared secret.

In another example embodiment, an encryption method to develop a shared secret by each of a plurality of devices may include, by each of the plurality of devices, identifying others of the plurality of devices, calculating a relative distance to the others of the plurality of devices, sharing calculated relative distances with the others of the plurality of devices, autonomously calculating a centroid of the plurality of devices based at least in part on the shared calculated relative distances, and communicating using the calculated centroid as a shared secret.

In still another example embodiment, a non-transitory computer-readable medium may store executable instructions that, if 0 executed, cause a computing component of a device to perform operations that may include autonomously calculating a centroid of a plurality of devices of which the device is a part, based at least in part on relative distances between the device and others of the plurality of devices and relative distances among the others of the plurality of devices, and autonomously establishing the centroid as a shared secret.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings, in which:

DETAILED DESCRIPTION

Figure 1:
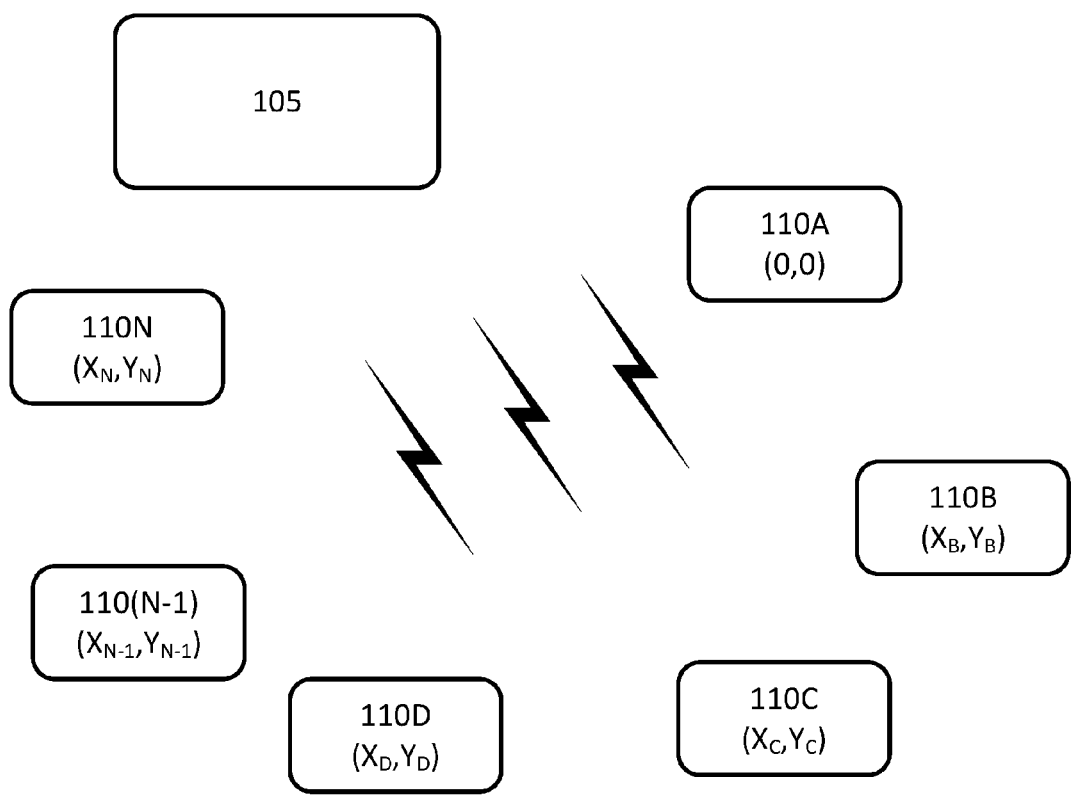
FIG. 1 shows an example configuration of a system of devices by which secure communication may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Generally speaking, using a combination of mutual identification, relative distance determination, relative distance information sharing, and centroid determination, a shared secret may be generated inside each of a multiple number of devices without the shared secret being communicated between a communication-initiating device and any of the devices, or between any of the devices themselves. In some examples, the communication-initiating device may be configured to initiate a process by which: each of a plurality of communicating devices respectively identifies itself to the others of the plurality of communicating devices; determines a relative distance to each of the others of the plurality of communicating devices; shares the relative distances with each of the others of the plurality of communicating devices; and determines a centroid (e.g., a volume centroid) of the positions relative to each of the others of the plurality of communicating devices. The centroid calculated autonomously by each of the communicating devices may serve as, or serve as a portion of, the shared secret (e.g., an encryption key, password, passphrase, etc.) by which the communicating devices may communicate securely with one another. Furthermore, the shared secret may be used in combination with other encryption techniques to enable secure communication.

FIG. 1 shows an example configuration of a system 100 of devices by which secure communication may be implemented, arranged in accordance with at least some embodiments described herein. As depicted, system 100 includes, at least, a first device 105 and a plurality of second devices 110A, 110B, 110C, . . . , 110N. Hereafter, unless context requires otherwise, collective reference may be made to "second devices 110" or singular reference may be made to "second device 110." In some embodiments, one or more of second devices 110 may be an embedded wireless device that, for example, includes a wireless interface. As referenced herein, an embedded wireless device may refer to a device that has limited or no user interface, keypad, accelerometer, microphone, or speaker. That is, an embedded wireless device has what may be considered reduced function capabilities in the present era of multi-functional devices; and therefore, in accordance with some embodiments, an embedded wireless device may function primarily as an autonomous device that substantially lacks or provides limited or reduced user-input functionality and requires no network connection.

In some embodiments of system 100, first device 105 and second device 110A, second device 110B, second device 110C, . . . , second device 110N may be, for example, mobile devices or non-mobile devices, or a combination of mobile devices and non-mobile devices. Non-limiting examples for implementing first device 105 and second devices 110 (or at least second devices 110) may include systems and components in a processing plant, a hospital, a vehicle, a communications system, and a commercial or residential building (including power systems; heating, ventilation, and air conditioning (HVAC) systems; lighting; doors; and windows), monitoring equipment, engines, and hydraulic system components. This short list is illustrative only and should not be construed as limiting in any way.

First device 105, as described herein, may be referred to as a "master device", and may be configured to select devices from among second devices 110 to form a group of second devices 110 and to initiate calibration of the selected second devices 110. In some embodiments, the group is formed to enable its members (e.g., selected second devices 110) to communicate securely among themselves using a shared secret that is unique to the group. The shared secret may be generated autonomously by each of second devices 110 selected to be in the group, and need not be communicated to first device 105 or to any of second devices 110. However, the term "master device" is merely illustrative and is used for the purpose of easier understanding, and should not be construed as limiting in any way. First device 105 may actually be one of second devices 110. The role of first device 105 in selecting second devices 110 is described next; the role of first device 105 in initiating calibration of second devices 110 is described below with reference to FIG. 6.

In at least one embodiment, first device 105, acting as the master device, may be configured to form the group of second devices 110 by sending one or more unencrypted signals to each of the selected second devices 110. The unencrypted signal may be sent to the selected second devices 110 as an indication of the selection. In at least some embodiments, first device 105 (as a master device) may then withdraw from the overall shared secret generation subsequent to sending the unencrypted signals.

First device 105 may be a laptop computer, a mobile phone, or other device capable of communicating with one or more of second devices 110 wirelessly.

Second devices 110, selected by first device 105 to be in a group to be able to communicate securely among themselves, may each be configured to implement secure wireless communication using a shared secret that is autonomously determined by each of the selected second devices 110 based on the relative distances separating them from each other. In some examples, one or more of second devices 110, selected by first device 105, may be included with a fixed article or a portable article such as a laptop, tablet, or smart device (including, but not limited to, a smartphone or article embodying a smart device), or with a component mounted on or associated with a fixed article or a portable article. In at least one embodiment described below, movement of the fixed article or portable article may be detected in accordance with the secret communication (for example, encrypted communication may fail because second devices 110 no longer determine the same key due to the movement of the devices).

Figure 2:
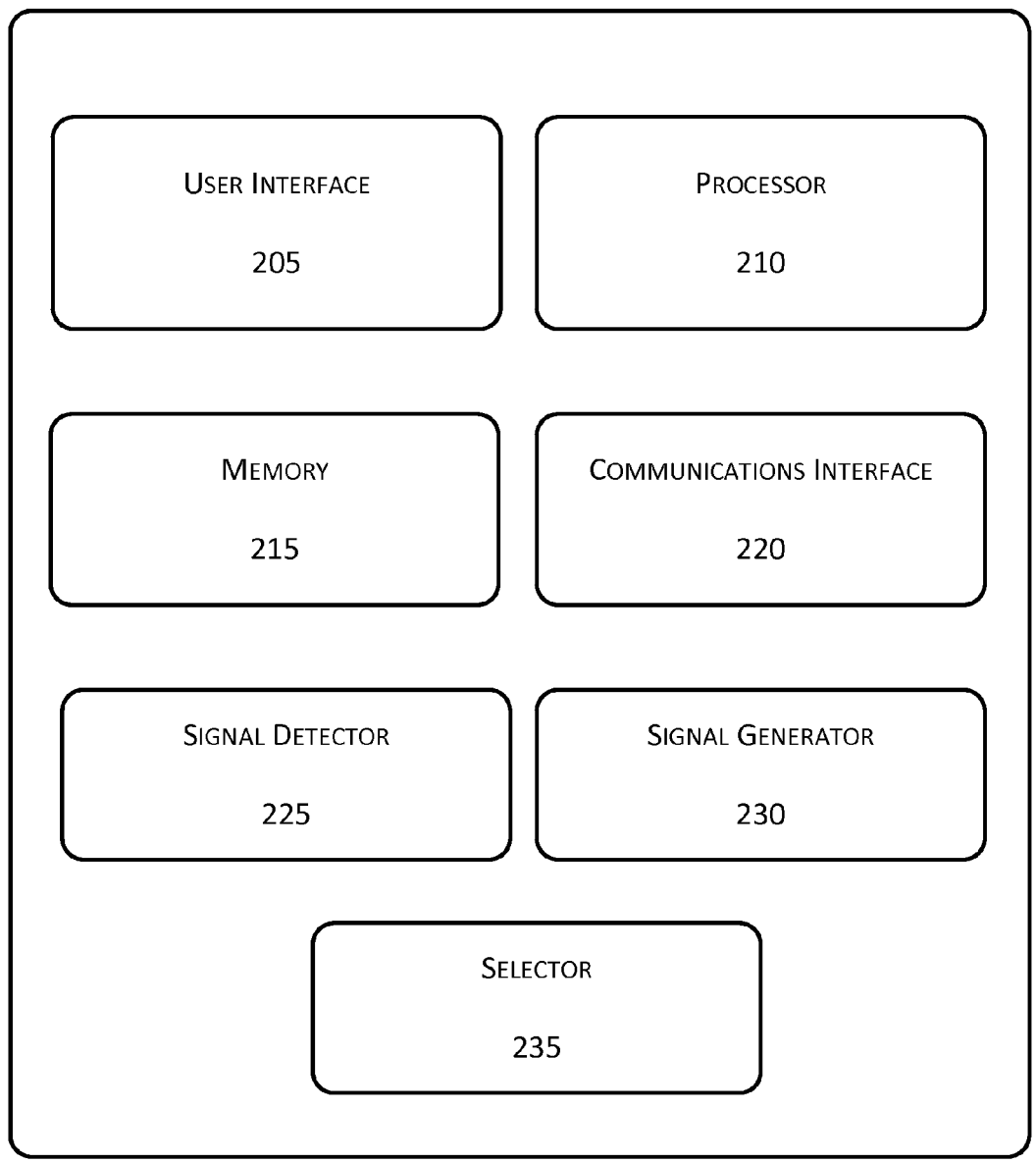
FIG. 2 shows an example configuration of a device by which various aspects of secure communication, including initiation, may be implemented, arranged in accordance with at least some embodiments described herein.

FIG. 2 shows an example configuration of first device 105 by which various aspects of secure communication, including initiation, may be implemented, arranged in accordance with at least some embodiments described herein. As depicted, first device 105 may be configured to include a user interface 205, a processor 210, a memory 215, a communications interface 220, a signal detector 225, a signal generator 230, and a selector 235. Any one or more of user interface 205, processor 210, memory 215, communications interface 220, signal detector 225, signal generator 230, and selector 235 may be implemented as hardware, software, firmware, or any combination thereof. Further, first device 105 is not limited to such components, as modifications may be made by combining two or more of the components described herein, eliminating at least one of the components, adding further components, substituting components, or even having various components assuming sub-processing roles accorded to other components in the following description.

User interface 205 may refer to one or more components configured, designed, and/or programmed to receive input from a user and/or provide an output to a user. In this sense, user may include a human or non-human user, and no limitation on the meaning of "user" should be inferred.

Processor 210 may refer to one or more components configured, designed, and/or programmed to control one or more operations of first device 105.

Memory 215 may refer to any hardware and/or one or more virtual components configured to store at least executable instructions and/or data. In some examples, memory 215 may include a system memory configured to store, inter alia, instructions to be executed by one or more embodiments of processor 210. Memory 215 may also, or alternatively, include one or more storage devices configured to store data for various purposes, including retrieval to system memory for use by the one or more embodiments of processor 210.

Communications interface 220 may refer to one or more components configured, designed and/or programmed to conduct or facilitate communications with, at least, one or more of second devices 110. In some embodiments, communications interface 220 may be a wireless interface or a Near-Field Communication (NFC) interface, but such are merely examples.

Signal detector 225 may refer to one or more components configured, designed and/or programmed to detect one or more communication signals from, for example, one or more of second devices 110. In accordance with such example, signal detector 225 may be configured to receive signals from one or more of second devices 110 to, e.g., confirm receipt of a signal from first device 105.

Signal generator 230 may refer to one or more components configured, designed and/or programmed to generate one or more communication signals to be sent to, for example, one or more second devices 110 to initiate a calibration process. In accordance with such example, signal generator 230 may be configured to, e.g., transmit a calibration instruction signal at an arbitrary level. The signal level of a "transmit signal" (e.g., a calibration instruction signal transmitted by first device 105) may be referred to hereafter as a "transmit signal level" or "transmit level." "Transmit signal level," "transmit level," "received signal level," "receive level," or "signal level" may refer to signal strength, signal power, or any measure of a transmit signal or receive signal, as the case may be, that may be quantified in accordance with at least the embodiments described herein. For convenience, "signal level" will represent any such measure.

Selector 235 may refer to one or more components configured, designed and/or programmed to select devices from among second devices 110 to be members of a group formed to enable its members (e.g., second devices 110) to communicate securely among themselves using a shared secret that is unique to the group.

Figure 3:
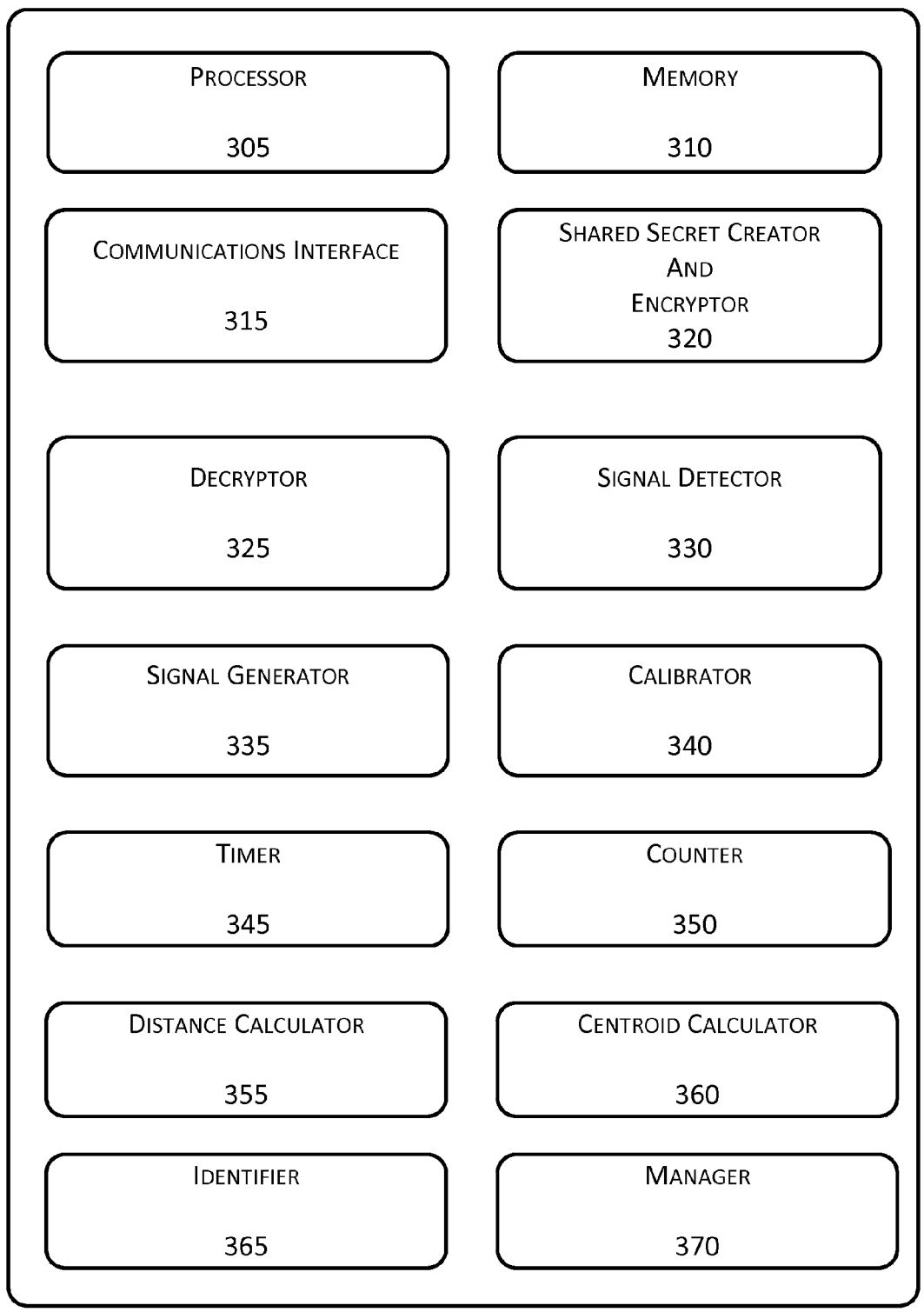
FIG. 3 shows an example configuration of a device by which various aspects of secure communication may be implemented, arranged in accordance with at least some embodiments described herein.

FIG. 3 shows an example configuration of a second device 110 by which various aspects of secure communication may be implemented, arranged in accordance with at least some embodiments described herein. As depicted, second device 110 may be configured to include a processor 305, a memory 310, a communications interface 315, a shared secret creator and encryptor 320, a decryptor 325, a signal detector 330, a signal generator 335, a calibrator 340, a timer 345, a counter 350, a distance calculator 355, a centroid calculator 360, an identifier 365, and a manager 370. Any one or more of processor 305, memory 310, communications interface 315, shared secret creator and encryptor 320, decryptor 325, signal detector 330, signal generator 335, calibrator 340, timer 345, counter 350, distance calculator 355, centroid calculator 360, identifier 365, and manager 370 may be implemented as hardware, software, firmware, or any combination thereof. Further, second device 110 is not limited to such components, as modifications may be made by combining two or more of the components described herein, eliminating at least one of the components, adding further components, substituting components, or even having various components assuming sub-processing roles accorded to other components in the following description.

Processor 305 may refer to one or more components configured, designed, and/or programmed to control one or more operations of second device 110.

Memory 310 may refer to any hardware and/or one or more virtual components configured to store, e.g., executable instructions and/or data. In some examples, memory 310 may include system memory configured to store, inter alia, instructions for execution by one or more embodiments of processor 305. Memory 310 may also, or alternatively, include one or more storage devices to store data for various purposes, including retrieval to system memory for use by the one or more embodiments of processor 305.

Communications interface 315 may refer to one or more components configured, designed and/or programmed to conduct or facilitate communication with another device (e.g., with first device 105 or any of second devices 110). In some embodiments, communications interface 315 may be a wireless interface or an NFC interface, but such are merely examples.

Shared secret creator and encryptor 320 may refer to one or more components configured, designed and/or programmed to generate a shared secret by which information may be encrypted to provide secure transfer between second device 110 and others of second devices 110. In some embodiments, each of second devices 110 may generate its own shared secret, thus avoiding the need to transfer a corresponding secret to others of second devices 110. Shared secret creator and encryptor 320 may be a component distinct from processor 305, but some or all functions performed by shared secret creator and encryptor 320 may be performed by processor 305, in which case processor 305 may be considered to include part or all of shared secret creator and encryptor 320. Details of shared secret creator and encryptor 320 are further discussed below with respect to FIG. 4.

Decryptor 325 may refer to one or more components configured, designed and/or programmed to decrypt encrypted data received from, e.g., others of second devices 110 and/or stored on second device 110.

Signal detector 330 may refer to one or more components configured, designed and/or programmed to detect one or more communication signals from, for example, first device 105 and/or another second device 110. In accordance with such example, signal detector 330 may be configured to, e.g., receive a calibration signal from first device 105 and/or a message from another second device 110 communicating a signal level at which a signal from second device 110 was received by the other second device 110. The signal level of such a "received signal" (e.g., a signal received by the other second device 110) may be referred to hereafter as a "received signal level" or "receive level."

Signal generator 335 may refer to one or more components configured, designed and/or programmed to generate one or more communication signals to be sent to, for example, first device 105 as part of the calibration process and/or another second device 110 in a message communicating a signal level.

Calibrator 340 may refer to one or more components configured, designed and/or programmed to calibrate signal generator 335, e.g., in response to receiving a calibration instruction signal from first device 105. In some examples, signal generator 335 may be calibrated to transmit at a signal level that matches the transmit signal level of the calibration instruction signal. Accordingly, the transmit signal levels of all second devices 110 may be matched to the transmit signal level of first device 105 and thus made equal. Matching transmit signal levels may enable two of second devices 110 to determine their relative distance from each other, as described below with respect to some embodiments.

Timer 345 may refer to one or more components configured, designed, and/or programmed to measure, output, or control one or more components of second device 110 in regards to generation of a shared secret. In accordance with at least one embodiment, timer 245 may be configured to invalidate the shared secret after a preset time has elapsed from its creation.

Counter 350 may refer to one or more components configured, designed, and/or programmed to measure, output, or control one or more components of second device 110 in regards to usage of a shared secret. In accordance with at least one embodiment, counter 350 may be configured to invalidate the shared secret after a preset number of such instances has elapsed from its creation.

Distance Calculator 355 may refer to one or more components configured, designed, and/or programmed to calculate a relative distance separating second device 110 from another second device 110.

Centroid Calculator 360 may refer to one or more components configured, designed, and/or programmed to calculate a centroid of points corresponding to the locations of second devices 110 relative to an origin.

Identifier 365 may refer to one or more components configured, designed, and/or programmed to identify second devices 110 to be members of a group.

Manager 370 may refer to one or more components configured, designed, and/or programmed to manage, e.g., arrange, second devices 110 in, e.g., an order in which calibration instruction signals were transmitted to each of second devices 110 by first device 105.

Figure 4:
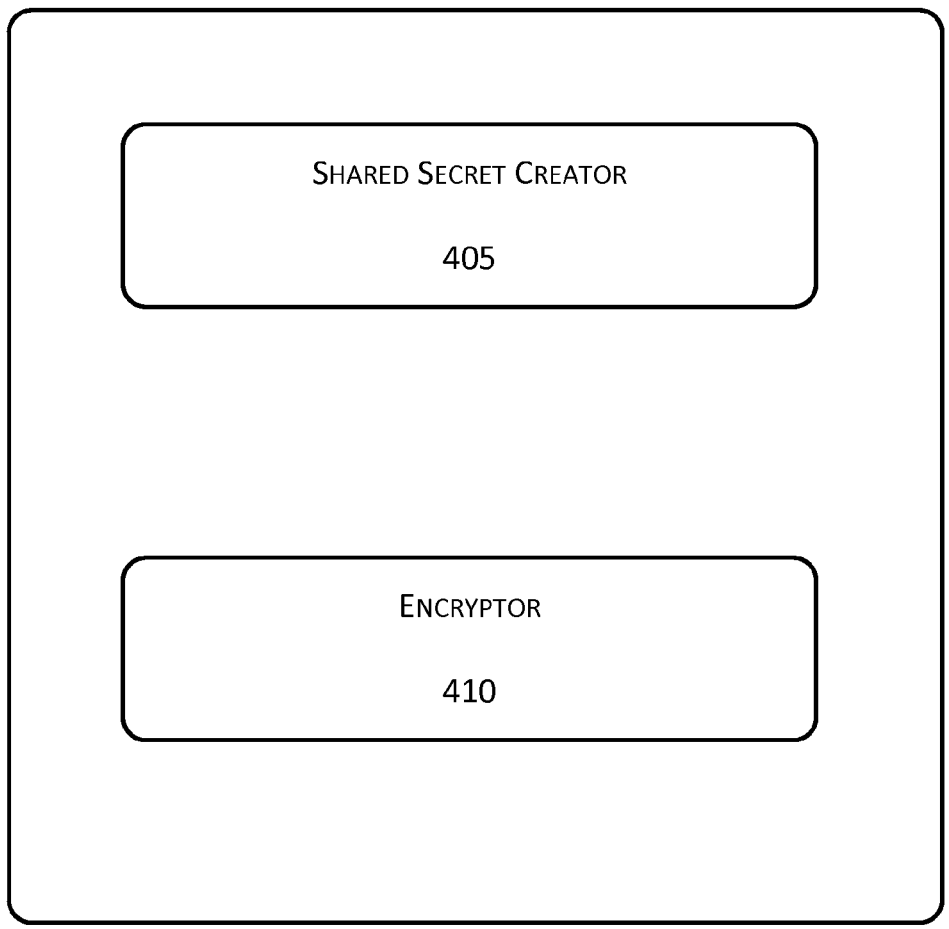
FIG. 4 shows an example configuration of a shared secret creator and encryptor that may be implemented in a device by which at least aspects of secure communication may be implemented, arranged in accordance with at least some embodiments described herein.

FIG. 4 shows an example configuration of shared secret creator and encryptor 320 that may be implemented in a device by which at least aspects of secure communication may be implemented, arranged in accordance with at least some embodiments described herein. As depicted, shared secret creator and encryptor 320 may include a shared secret creator 405 and an encryptor 410. Further, shared secret creator and encryptor 320 may be implemented as hardware, software, and/or firmware. Further still, shared secret creator and encryptor 320 is not limited to such components, as obvious modifications may be made by combining two or more of the components described herein, eliminating at least one of the components, adding further components, substituting components, or even having various components assuming sub-processing roles accorded to other components in the following description.

Shared secret creator 405 may refer to one or more components configured, designed, and/or programmed to generate at least portions of a shared secret by which information may be encrypted. In at least some embodiments, "information" may include a signal that comprises a command, text, video data, audio data, still image data, etc., or any combination of these. In at least some embodiments, a shared secret may correspond to a received signal level of a signal received by second device 110 from another of second devices 110, for the purpose of determining their relative distance of separation. In at least some embodiments, a shared secret may correspond to a centroid of second devices 110. Examples of generating the shared secret are described below.

Encryptor 410 may refer to one or more components configured, designed and/or programmed to encrypt information by use of, e.g., a shared secret created by shared secret creator 405. In some examples, by use of the shared secret, encryptor 410 of a second device 110 may encrypt information for secure transfer to another second device 110. In some examples, encryptor 410 of a second device 110 may encode a signal to be transmitted to another second device 110 with the signal level at which a signal was received by second device 110.

Figure 5:
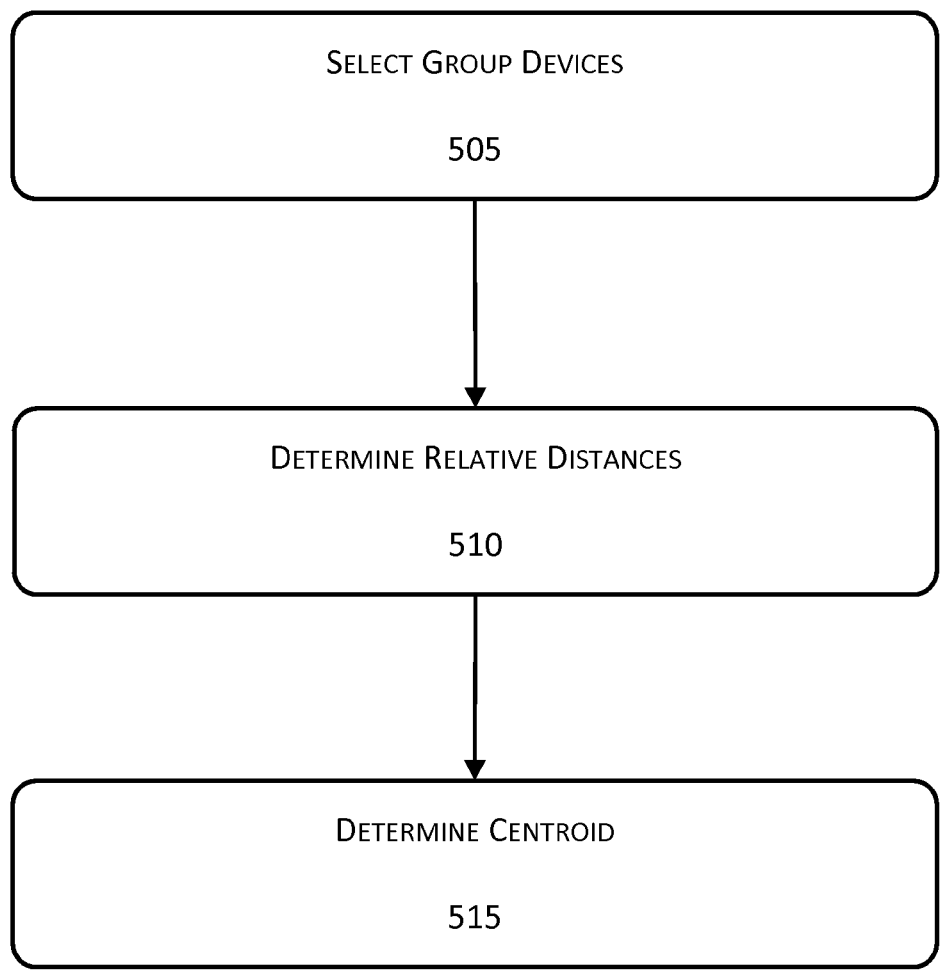
FIG. 5 shows an example processing flow by which a system of devices may attempt to develop a secret key to implement at least various aspects of secure communication, in accordance with at least some embodiments described herein.

FIG. 5 shows an example processing flow 500 by which a system of devices may attempt to develop a secret key to implement at least various aspects of secure communication, in accordance with at least some embodiments described herein. Processing flow 500 may be implemented by first device 105 and second devices 110. Further, processing flow 500 may include one or more operations, actions, or functions depicted by one or more blocks 505, 510, and 515. Although illustrated as discrete blocks, various blocks may be divided into additional blocks, combined into fewer blocks, or eliminated, depending on the desired implementation. Processing flow 500 may begin at block 505.

Block 505 (Select Group Devices) may refer to selector 235 corresponding to first device 105 implementing selection of second devices 110A, 110B, 110C, . . . , 110N to be members of a group comprising at least part of system 100. In some embodiments, selection is implemented in accordance with processor 210 controlling signal generator 230 to transmit wireless signals to the selected second devices 110. In some embodiments, first device 105 may present to a user many wireless devices, including second devices 110, to be members of a group formed for secure communication. In some examples, the group may be formed by the user inputting information via user interface 205, according to which selector 235 may select second devices 110 to be members of the group in accordance with the transmitted wireless signals (hereinafter, "second device(s) 110" will refer to the one or more second devices 110 that are selected as members of the group). In some embodiments, a program running on first device 105 may automatically control selector 235 to select second devices 110 to be members of the group. In some embodiments, the group may instead or additionally be pre-configured and/or provided to first device 105 (e.g., without selection via user interface 205 or automatically by first device 105). Block 510 may follow block 505.

Block 510 (Determine Relative Distances) may refer to distance calculator 355 corresponding to each of second devices 110 determining the relative distances between itself and the others of second devices 110 based on a transfer of messages (e.g. messages received by signal detector 330 and transmitted by signal generator 335) encoded with the receive levels of the respective messages. The distances may be measured in units that suit the environment in which second devices are located. In some examples, in a building environment, the relative distances may be measured in feet or meters. In a more compact environment, such as a machine or laboratory, the relative distances may be measured in inches or centimeters. Details of determining the relative distances are described below with respect to FIG. 6. Block 515 may follow block 510.

Block 515 (Determine Centroid) may refer to centroid calculator 360 corresponding to each of second devices 110 independently (i.e., independently of other second devices 110) determining the centroid of points corresponding to the locations of all second devices 110 in the group relative to an origin, based on the relative distances determined by distance calculator 355 in block 510. The centroid may be used as an encryption/decryption key for subsequent communications among second devices 110.

Figure 6:
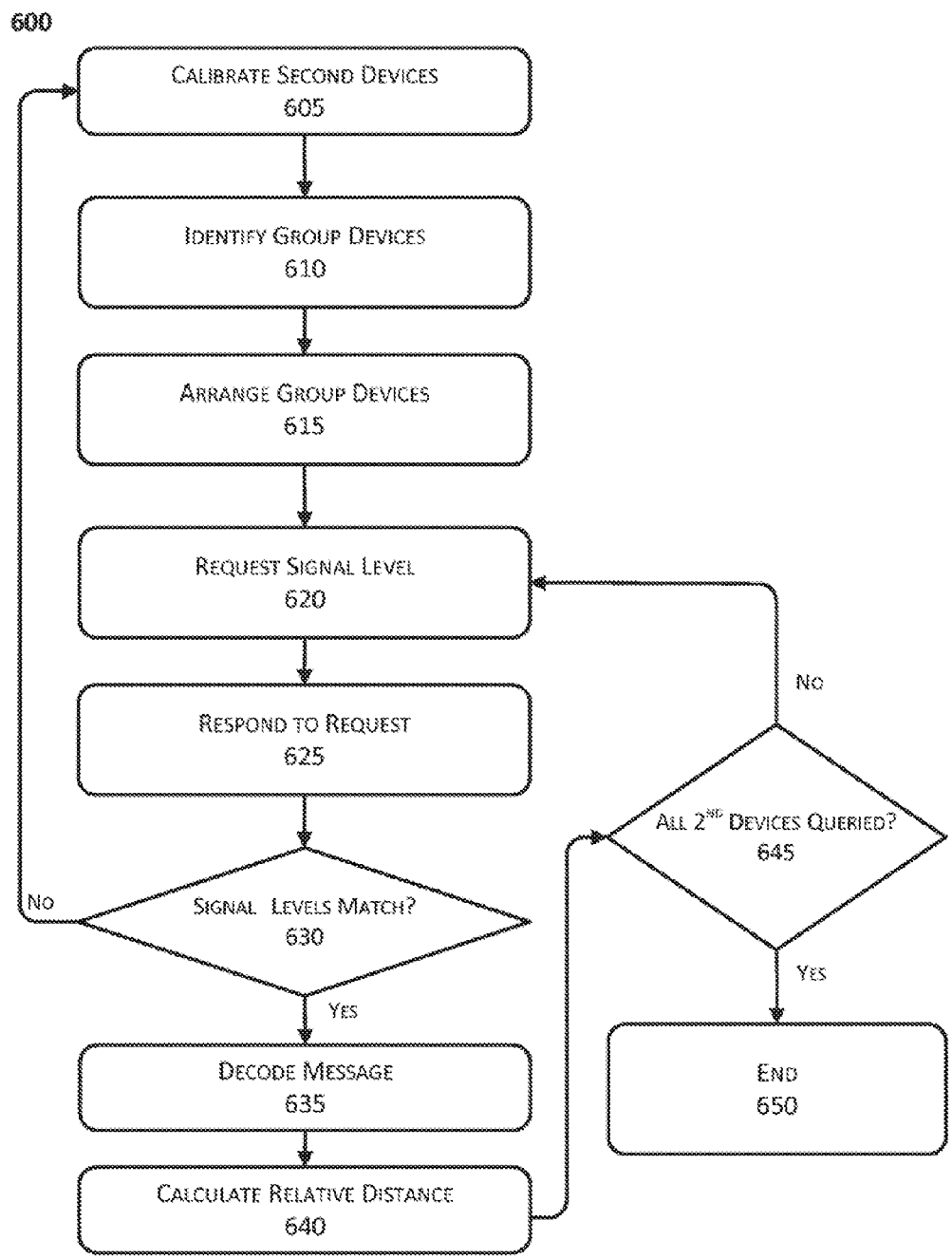
FIG. 6 shows an example processing flow illustrating further details of the processing flow illustrated in FIG. 5, in accordance with at least some embodiments described herein.

FIG. 6 shows an example processing flow 600 illustrating further details of processing flow 500 illustrated in FIG. 5, in accordance with at least some embodiments described herein. Processing flow 600 may correspond to determining relative distances between second devices 110 as described above with reference to processing flow 500. Processing flow 600 may be implemented by first device 105 and second devices 110 or by second devices 110. Further, processing flow 600 may include one or more operations, actions, or functions depicted by one or more blocks 605, 610, 615, 620, 625, 630, 635, 640, 645, and 650. Although illustrated as discrete blocks, various blocks may be divided into additional blocks, combined into fewer blocks, or eliminated, depending on the desired implementation. Processing flow 600 may begin at block 605.

Block 605 (Calibrate Second Devices) may refer to signal generator 230 corresponding to first device 105 transmitting respective wireless signals to instruct second devices 110 to calibrate their respective wireless transmit levels. In some embodiments, signal generators 335 corresponding to second devices 110 may send a confirmation signal to first device 105 to confirm receipt of the calibration instruction signal. In some embodiments, the wireless signals may be the same signals transmitted by signal generator 230 to select second devices 110 to be members of the group in Block 505. In some examples, signal generator may send a signal to second device 110A, second device 110B, second device 110C, ..., second device 110N in turn, instructing them to adjust their respective wireless transmit levels to an arbitrary signal level. In some embodiments, the arbitrary signal level may be provided by a program running on first device 105 or by a user of first device 105. The arbitrary signal level may be the wireless transmit level of the calibration instruction sent by first device 105. The instructing of second devices 110A through 110N to calibrate their wireless transmit levels may cause each of second devices 110 in the group to transmit at the same wireless signal level (e.g., a signal level that is within a tolerance, or that is equal to a degree of precision, preset for the calibration). Further, the order in which the calibration instruction signals are sent to second devices 110A through 110N may determine the order in which second devices 110A through 110N will query one another in the process of determining their relative distances of separation. Block 610 may follow block 605.

Block 610 (Identify Group Devices) may refer to identifier 365 corresponding to each of second devices 110A through 110N identifying the members of the group (i.e., the others of second devices 110A through 110N included in the group). In some examples, signal detector 330 may detect the calibration instruction signals sent by first device 105 to second devices 110A through 110N, and identifier 365 may identify second devices 110A through 110N from their respective calibration instruction signals. Block 615 may follow block 610.

Block 615 (Arrange Group Devices) may refer to manager 370 corresponding to each of second devices 110A through 110N arranging all second devices 110A through 110N in a manner or arrangement that conveys or represents an order in which signal detector 330 detected the calibration instruction signals sent by first device 105 (i.e., the order in which second devices 110A through 110N were instructed to be calibrated by first device 105). Manager 370 corresponding to each of second devices 110A through 110N may determine the order of calibration from the calibrate instructions themselves (i.e., each of second devices 110 may detect each calibration instruction sent by first device 105 to each of second devices 110, and may thus determine the order of calibration in accordance with the order of calibration instruction). In some embodiments, the order of calibration may determine the order in which each of second devices 110 determines its relative distance to the other second devices 110. A person of ordinary skill in the art will readily determine other arrangements or representations of the order in which second devices 110 were calibrated, all of which are considered to be within the scope of this disclosure. Thus, second devices 110A through 110N have arranged themselves into the same order in which they were calibrated. Block 620 may follow block 615.

Block 620 (Request Signal Level) may refer to signal generator 335 corresponding to second device 110A transmitting a wireless signal to second device 110B to request the signal level at which second device 110B received the request of second device 110A. Second device 110A and second device 110B may be first and second in the order in which second devices 110A through 110N were calibrated by first device 105 in block 605 and arranged in block 615. Second device 110A may begin relative distance measurement because it has identified itself as the first one of second devices 110 to be calibrated. Block 625 may follow block 620.

Block 625 (Respond to Request) may refer to second device 110B signal generator 335 responding to the request from second device 110A with a coded message that is encoded with a key by encryptor 410. In some embodiments, the key with which the response is encoded is the receive level of signal detector 330 corresponding to second device 110B (i.e., the level at which signal detector 330 corresponding to second device 110B received the query from second device 110A). Decision block 630 may follow block 625.

Decision block 630 (Signal Levels Match?) may refer to signal detector 330 corresponding to second device 110A determining whether the signal level of the signal received from second device 110B is equal to the signal level of the signal generated by signal generator 335 and received by second device 110B from second device 110A. Upon a negative determination (i.e., "NO" at decision block 630), processing flow 600 may revert to block 605 (Calibrate Second Devices) for recalibration of some or all of second devices 110; however, upon a positive determination (i.e., "YES" at decision block 630), block 635 may follow decision block 630.

Block 635 (Decode Message) may refer to decryptor 325 corresponding to second device 110A decoding the message received from second device 110B and detected by signal detector 330 corresponding to second device 110A. In some embodiments, decryptor 325 corresponding to second device 110A is able to decrypt the coded message because, assuming that calibrators 340 corresponding to second devices 110A and 110B properly calibrated signal generators 335 in block 605, the receive level (i.e., the received signal level) at which signal detector 330 corresponding to second device 110A received the coded message should be equal to the receive level at which signal detector 330 corresponding to second device 110B received the request from second device 110A, to a degree of precision preset for the decoding. Because the key may be determined in accordance with the locations of second devices 110A and 110B, security may be enhanced: An eavesdropper cannot be in the exact same physical location as either second device 110A or second device 110B so as to learn the key and decode the message. As a result, second devices 110A and 110B may independently determine how far they are from each other, as described below with reference to block 640.

In general, the coded message received by a querying second device 110 from a queried second device 110 may include any information related to the components or functioning of the system, including relative distances between the queried second device and each of the other second devices that precede the querying second device in the arrangement determined in block 615. Examples are described below with respect to queried devices other than second device 110B. However, because there are no querying second devices that precede second device 110A in the arrangement determined in block 615, the coded message received by second device 110A from second device 110B does not include relative distance information between second device 110B and any other second device 110 in this embodiment. Block 640 may follow block 635.

Block 640 (Calculate Relative Distance) may refer to distance calculator 355 of second devices 110A and 110B determining the relative distance separating one from the other using the transmit and receive signal levels of the signals generated and detected, respectively, by signal generator 335 and signal detector 330 corresponding to each of second devices 110A and 110B. The relative distance may be determined by the person of ordinary skill using known techniques, given the transmit and receive signal levels of both devices. Decision block 645 may follow block 640.

Decision block 645 (All Second Devices Queried?) may refer to identifier 365 corresponding to second device 110A determining and then indicating whether all second devices 110B through 110N have been queried by second device 110A with a request for the signal level at which each respective second device 110B through 110N receives the request of second device 110A. Upon a negative determination, i.e., "NO," at decision block 645, processing flow 600 may revert to block 620 where second device 110A may request the receive signal level from the second device 110 that follows in the arrangement (e.g., following the above-described request/response communications with second device 110B, second device 110A may request the receive signal level from second device 110C); however, upon a positive determination, i.e., "YES," at decision block 645, the querying by second device 110A is complete with respect to second devices 110B through 110N in the arrangement determined in block 615 (i.e., second device 110A has queried all of second devices 110B through 110N); and memory 310 corresponding to second device 110A stores the relative distances between second device 110A and each of second devices 110B through 110N. Block 650 (End) then follows decision block 645 and processing flow 600 ends with respect to second device 110A as the querying device.

As described above, processing flow 600 may be implemented using each of second devices 110A through 110N. In some examples, processing flow 600 may be implemented by second device 110B as the querying second device. Second device 110B, however, need not query second device 110A with a request for its receive signal level because second device 110B may determine that the receive signal level of second device 110A of a signal received from second device 110B is equal to the receive signal level of second device 110B of the signal received from second device 110A, to a degree of precision preset for the decoding, as described above. Instead, processing flow 600 may proceed in the manner described above, with second device 110B as the querying device, requesting of second device 110C the signal level at which second device 110C received the request signal from second device 110B.

With second device 110B as the querying device, blocks 610 and 615 need not be repeated because second device 110B has already performed the identifying and arranging as described above (unless a negative determination (i.e., "NO") is made at decision block 630). Thus, blocks 620 through 645 may be repeated with second device 110B as the querying second device and second devices 110C through 110N, in turn, as the queried second device. Thus, for example, block 620 (Request Signal Level) may refer to signal generator 335 corresponding to second device 110B sending a request to second device 110C for the signal level at which second device 110C received the request of second device 110B. Block 625 may follow block 620.

Here, block 625 (Respond to Request) may refer to second device 110C responding to the request from second device 110B via signal generator 335 with a coded message that is encoded with a key by encryptor 410. In some embodiments, the key with which the response is encoded is the receive level of signal detector 330 corresponding to second device 110C (i.e., the level at which signal detector 330 corresponding to second device 110C received the query from second device 110B). This signal level may be different from the receive signal level received by second device 110B from second device 110A, for example because the relative distance between second device 110C and second device 110B may be different from the relative distance between second device 110B and second device 110A. Thus, the key with which encryptor 410 corresponding to second device 110C encoded the message for responding to the request from second device 110B may be correspondingly different from the key with which encryptor 410 corresponding to second device 110B encoded the message for responding to the request from second device 110A.

Decision block 630 (Signal Levels Match?) may refer to signal detector 330 corresponding to second device 110B determining whether the signal level of the signal received from second device 110C is equal to the signal level of the signal generated by signal generator 335 and received by second device 110C from second device 110B. Upon a negative determination (i.e., "NO" at decision block 630), processing flow 600 may revert to block 605 (Calibrate Devices) for recalibration of at least one of second device 110B and second device 110C. In some embodiments, some or all of second devices 110A and 110D through 110N may be recalibrated as well. However, upon a positive determination (i.e., "YES" at decision block 630), block 635 may follow decision block 630.

Block 635 (Decode Message) may refer to decryptor 325 corresponding to second device 110B decoding the message received from second device 110C and detected by signal detector 330 corresponding to second device 110B. In some embodiments, decryptor 325 corresponding to second device 110B may decrypt the coded message because, assuming second devices 110B and 110C properly calibrated themselves under instruction by first device 105, the receive level at which signal detector 330 corresponding to second device 110B received the coded message should be equal to the receive level at which signal detector 330 corresponding to second device 110C received the request from second device 110B, to a degree of precision preset for the decoding. As a result, second devices 110B and 110C may independently determine how far they are from each other, as described below with reference to block 640.

As described above, the coded message received by a querying second device 110 from a queried second device 110 may include any information related to the components or functioning of the system, including relative distances between the queried second device and each of the other second devices that precede the querying second device in the arrangement determined in block 615. Thus, with respect to second device 1106 as the querying device and second device 110C as the queried device, the coded message received by second device 1106 may include the relative distance between second device 110C and second device 110A, which may have been determined in accordance with the request for a receive signal level made of second device 110C by second device 110A during the query-response processing described above. As a result of this sharing of the relative distance, second device 1106 may store in its memory 310 the relative distance between itself and second device 110A and the relative distance between second device 110C and second device 110A.

In block 640, distance calculators 355 of second device 1106 and second device 110C may calculate the relative distance between second device 1106 and second device 110C; this relative distance may be added to the relative distance information already stored in memory 310 corresponding to second device 1106. Thus, second device 1106 may store in memory 310 the relative distances between itself and second device 110A, between itself and second device 110C, and between second device 110C and second device 110A.

With respect to second device 110B as the querying second device, decision block 645 (All Second Devices Queried?) may refer to identifier 365 corresponding to second device 110B determining whether all second devices 110C through 110N have been queried by second device 110B with a request for the signal level at which each respective second device 110C through 110N received the request of second device 110B. Upon a negative determination, i.e., "NO," at decision block 645, processing flow 600 may revert to block 620 where second device 110B may request the receive signal level from the next second device 110 in the arrangement (e.g., following the above-described request/response communications with second device 110C, second device 110B may request the receive signal level from second device 110D); however, upon a positive determination, i.e., "YES," at decision block 645, the querying by second device 110B is complete with respect to second devices 110 that follow second device 110B in the arrangement determined in block 615 (i.e., second device 110B has queried all of second devices 110C through 110N); and memory 310 corresponding to second device 110B stores the relative distances between second device 110B and each of second devices 110A and 110C through 110N. Moreover, in a manner similar to that described above, the coded message received by second device 110B from each of second devices 110D through 110N may include the respective relative distances between second devices 110D through 110N and second device 110A, which may have been determined in accordance with the request for a receive signal level made of second devices 110D through 110N, respectively, by second device 110A during the query-response processing with second device 110A as querying device and second devices 110D through 110N as queried devices. As a result of this sharing of relative distances, memory 310 corresponding to second device 110B may also store the relative distances between second device 110A and second devices 110D through 110N, respectively. Block 650 (End) thus follows decision block 645 and processing flow 600 ends with respect to second device 110B as the querying device.

Processing flow 600 may be implemented in a similar manner with respect to each of second devices 110C through 110(N-1) as querying second device and each of second devices 110A through 110N as queried second device (second device 110N is a queried second device to all of second devices and may not act as querying second device in this embodiment). The result is that each of second devices 110A through 110N has accumulated N received signal levels, all communicated in encrypted form using keys that may change rapidly. In addition, each of second devices 110A through 110N has also gathered signal levels measured by the other second devices 110. Thus, each one of second devices 110A through 110N may determine the relative distances between all of second devices 110, for example without use or configuration in a network or with networked components such as base stations or hubs to triangulate each other. At the end of this process, each of second devices 110A through 110N may have an identical collection of relative distances.

Thus, there exists a relationship between second devices 110A through 110N and the relative distances. In some examples, the relationship may be expressed as an array of the relative distances, such as an N×N array or equivalent of the N second devices and N relative distances. In some examples, the N×N array may be an N×N matrix A of relative distances, in which the rows and columns each correspond to the N second devices and each element $A_{i,j}$ is the relative distance between the second devices 110 corresponding to row i and column j, respectively. Using known mathematical techniques, centroid calculator 360 of each of second devices 110A through 110N may thus independently calculate the centroid of the entire group of second devices 110A through 110N using the relationship, relative to a reference point such as an origin (0,0) in a two-dimensional space as depicted in FIG. 1 or (0,0,0) in a three-dimensional space. In some embodiments, second device 110A may be the reference point. In some embodiments, first device 105 may designate the reference point and communicate the same to all second devices 110 in the group. In some embodiments, centroid calculator 360 of each of second devices 110A through 110N may autonomously determine coordinates $(X_A, Y_A)$ through $(X_N, Y_N)$ of second devices 110A through 110N, respectively, and the coordinates of the centroid, or a coordinate system including the coordinates $(X_A, Y_A)$ through $(X_N, Y_N)$ of second devices 110A through 110N, respectively, and the coordinates of the centroid. Whether in two or three dimensions, the coordinates of the centroid may be the secret key for future secure communications.

As noted above, security is enhanced because an eavesdropper cannot be in the exact same physical location as any querying second device 110 or queried second device 110 so as to learn the key and decode the message of any single exchange. Notably, because the message exchanges may be encoded with keys that depend on the relative locations of the various pairs of querying and queried second devices 110, all message exchanges may be encoded with different keys.

Alternatively, or in conjunction with one or more of the examples described above, one or more second devices 110 may randomly query one or more other second devices 110 to request the signal level at which the other second device(s) 110 received the request, as described with respect to blocks 625-645. That is, any of second devices 110 belonging to the group may query any of the other second devices 110 of the group at random. As described above, each queried second device 110 may respond with a coded message that is encoded with a key which is the receive level at which the query was received by the queried second device 110. As in the foregoing examples, the coded message may include any information related to the components or functioning of the system. In accordance with random querying, the coded message may additionally include relative distances that have been determined or gathered by all queried second devices from other previously queried devices, without regard to the arrangement determined in block 615.

In some embodiments, the physical position of the centroid may be monitored, whether constantly, periodically, or intermittently, and the secret key may become invalid if there is any change in the physical position of the centroid. In this sense, the coordinates of the centroid may be said to "lock" second devices 110 together in space and thus provide spatial as well as communication security. "Locking" thus may mean that the movement of one of second devices 110 in the group changes the centroid, consequently causing the established secure communication to be lost.

If, for example, any of second devices 110 moves or fails, monitoring may reveal a change in the physical position of the centroid. In some embodiments, second devices 110 may collectively perform the monitoring by repeating processing flow 500 and processing flow 600 constantly, periodically, or intermittently. For example, in some embodiments, in response to a detected change, each of second devices 110 may recalculate a relative distance to the other second devices 110, share the recalculated relative distances with the other second devices 110, autonomously recalculate the centroid based at least in part on the shared recalculated relative distances, and communicate using the recalculated centroid as a shared secret.

Alternatively or additionally, any single second device 110 may randomly monitor one or more other second devices 110 constantly, periodically, or intermittently for, e.g., movement or failure relative to the second device 110 performing the monitoring. Such monitoring by a single second device 110 may be performed in accordance with the previously determined relative distance or signal without repeating processing flow 500 and processing flow 600 in their entirety; that is, detecting a change in the relative distance or signal itself may be sufficient to judge that the centroid has changed.

In some embodiments, an entity (e.g., a motion detector, power sensor, security personnel using a security camera, etc.) may perform physical monitoring of second devices 110. If motion or a power level change is detected, for example, the monitoring entity may communicate with, e.g., first device 105 or one of second devices 110, to initiate processing flow 500.

By way of one non-limiting example, consider a processing plant or portion thereof including first device 105 and second devices 110 (which may include pumps, flow control valves, level detectors, temperature sensors, etc.) to perform cooperatively and securely. A supervising application may be run on first device 105, which in some embodiments may be a tablet displaying representations of second devices 110 and operative interconnections therebetween such as electrical circuitry or fluid pipework. Any or all displayed items may be color-coded on the display.

In some embodiments, an operator may use first device 105 to select second devices 110 for a group as described above. In some examples, a human operator may implement selection using the display as a tactile interface. In a similar manner, an operator may use first device 105 to initiate calibration as described above. In some examples, after selection is completed, the operator may initiate calibration of second devices 110. In some examples, calibration may automatically begin with respect to each selected second device 110 in response to its selection.

In some embodiments, as each second device 110 is calibrated, its corresponding representation displayed on first device 105 may change to indicate a calibrated state. For example, the displayed representation corresponding to a calibrated second device 110 may flash green.

Following calibration and identification of all second devices 110, each second device 110 may begin to collect relative distance information or related signal levels for all other second devices 110, randomly or according to an ordered arrangement described above with respect to block 615, or by some combination of random and ordered collection. As described above, each second device 110 may transmit at an identical signal level. In some embodiments, this device-to-device polling may result in collisions or signal interference, which may be resolved by, e.g., a querying second device 110 retrying after a random interval.

In accordance with the gathered and determined relative distances or received signal levels, each of second devices 110 may have accumulated an identical collection of N relative distances or received signal levels. In a manner similar to that described above, centroid calculator 360 of each of second devices 110 may thus independently calculate the centroid of the entire group of second devices 110 using the N relative distances, relative to a reference point.

In some embodiments, each second device 110 may send a signal to first device 105 confirming calculation of the centroid. The confirmation signal may include an identifier of the device and need not be encoded. In some embodiments, if the displayed representation on first device 105 corresponding to a calibrated second device 110 changes (e.g., flashes green), the displayed representation may again change to indicate confirmation of the centroid calculation (e.g., the flashing green may change to a constant green). In some embodiments, when the display of first device 105 indicates confirmation of centroid calculation by all second devices 110 in the group, the operator may interpret the display to further indicate that the group is interlocked and secure.

In some embodiments, one or more second devices 110 may move by design at a predetermined time. In some embodiments, such movements may be made according to a predetermined pattern or patterns. In such embodiments, new keys may be generated by all of second devices 110 without input by first device 105. In other words the centroid does not have to be static, and first device 105 may be omitted from subsequent generation of secret keys.

In some embodiments as described, received signal levels may be determined by second devices 110, and relative distances between second devices 110 determined from the received signal levels by distance calculator 355. In such embodiments, the relative distances may be determined, accumulated, gathered, and/or shared among second devices 110, and the relationship may be created from the relative distances (e.g., an N×N matrix may be created from the relative distances). Furthermore, the relative distance between a querying second device 110 and a queried second device 110 may be used as the key by which encryptor 410 encodes the coded message responding to the request, e.g., in block 625. In this regard, because signal level varies with the inverse square of the distance between the transmitter and the receiver, in some embodiments the signal levels may be determined, accumulated, gathered, and/or shared among second devices 110 without converting them to relative distances prior to existence of the relationship. That is, rather than calculating relative distances as the query-response process is performed, signal levels may form the basis of the relationship (e.g., signal levels may be the elements $A_{i,j}$ of the N×N signal level matrix A, and a relative distance matrix calculated from the signal level matrix by known techniques).

Figure 7:
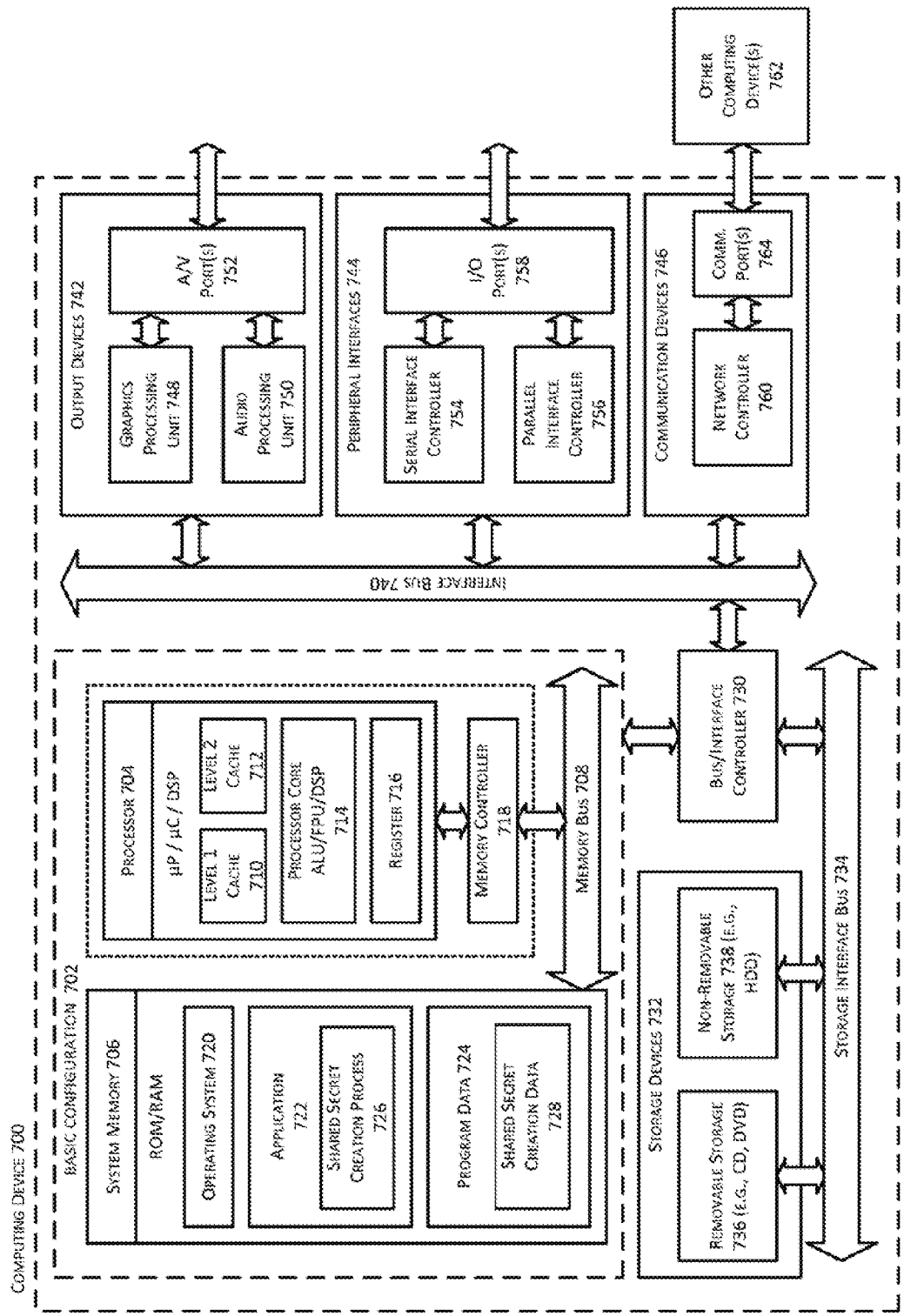
FIG. 7 shows a block diagram illustrating an example computing device by which various example solutions described herein may be implemented, arranged in accordance with at least some embodiments described herein.

FIG. 7 shows a block diagram illustrating an example computing device by which various examples of secret communication may be implemented, arranged in accordance with at least some embodiments described herein.

In a very basic configuration 702, computing device 700 typically includes one or more processors 704 and a system memory 706. A memory bus 708 may be used for communicating between processor 704 and system memory 706.

Depending on the desired configuration, processor 704 may be of any type including but not limited to a microprocessor (μP), a microcontroller (μC), a digital signal processor (DSP), or any combination thereof. Processor 704 may include one more levels of caching, such as a level one cache 710 and a level two cache 712, a processor core 714, and registers 716. An example processor core 714 may include an arithmetic logic unit (ALU), a floating point unit (FPU), a digital signal processing core (DSP Core), or any combination thereof. An example memory controller 718 may also be used with processor 704, or in some implementations memory controller 718 may be an internal part of processor 704.

Depending on the desired configuration, system memory 706 may be of any type including but not limited to volatile memory (such as RAM), non-volatile memory (such as ROM, flash memory, etc.) or any combination thereof. System memory 706 may include an operating system 720, one or more applications 722, and program data 724. Application 722 may include a shared secret creation process 726 that is arranged to perform the functions as described herein including those described with respect to processing flow 500 of FIG. 5 and processing flow 600 of FIG. 6. Program data 724 may include shared secret creation data 728 that may be useful for operation with shared secret creation process 726 as described herein. In some embodiments, application 722 may be arranged to operate with program data 724 on operating system 720 such that implementations of shared secret creation may be provided as described herein. This described basic configuration 702 is illustrated in FIG. 7 by those components within the inner dashed line.

Computing device 700 may have additional features or functionality, and additional interfaces to facilitate communications between basic configuration 702 and any required devices and interfaces. For example, a bus/interface controller 730 may be used to facilitate communications between basic configuration 702 and one or more data storage devices 732 via a storage interface bus 734. Data storage devices 732 may be removable storage devices 736, non-removable storage devices 738, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 706, removable storage devices 736 and non-removable storage devices 738 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 700. Any such computer storage media may be part of computing device 700.

Computing device 700 may also include an interface bus 740 for facilitating communication from various interface devices (e.g., output devices 742, peripheral interfaces 744, and communication devices 746) to basic configuration 702 via bus/interface controller 730. Example output devices 742 include a graphics processing unit 748 and an audio processing unit 750, which may be configured to communicate to various external devices such as a display or speakers via one or more A/V ports 752. Example peripheral interfaces 744 include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 700 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A device, comprising:
   a communication interface configured to exchange signals wirelessly with another device; and
   a computing component configured to:
   autonomously calculate a centroid of a mutually identifiable plurality of devices of which the device is a part, based at least in part on first respective distances between the device and each of others of the plurality of devices and second respective distances between pairs of the others of the plurality of devices;
   autonomously establish the centroid as a shared secret without communicating the shared secret to the others of the plurality of devices; and transmit a wireless signal encrypted with the shared secret to at least one of the others of the plurality of devices;
wherein the at least one of the others of the plurality of devices has calculated the centroid based on the mutually identifiable plurality of devices.

2. The device of claim 1, wherein the computing component is further configured to:
determine, autonomously, a coordinate system including coordinates of the others of the plurality of devices relative to the device as an origin of the coordinate system, based at least in part on the first respective distances and the second respective distances,
wherein to autonomously calculate the centroid of the plurality of devices is based at least in part on the coordinates of the determined coordinate system.

3. The device of claim 1, wherein the computing component is further configured to share the first respective distances with the others of the plurality of devices; and
wherein to autonomously calculate a centroid of the plurality of devices is based at least in part on the shared first respective distances.

4. The device of claim 3, wherein to share the first respective distances with the others of the plurality of devices includes transmitting signals that are encoded with a received signal level as a key.

5. The device of claim 1, wherein the computing component is further configured to:
determine an order for calculating the first respective distance to each of the others of the plurality of devices in turn, and
calculate the first respective distances to each of the others of the plurality of devices in the determined order.

6. The device of claim 5, wherein to share the first respective distances with the others of the plurality of devices is executed in the determined order.

7. The device of claim 1, wherein the computing component is further configured to:
identify the others of the plurality of devices; and
develop an array of the first and second respective distances.

8. The device of claim 1, wherein the device is further configured to periodically monitor the first respective distances.

9. An encryption method to develop a shared secret by each of a mutually identifiable plurality of devices, the method comprising, by a first device:
establishing a reference point of a coordinate system relative to the first device;
identifying others of the plurality of devices to calculate a centroid of the plurality of devices;
calculating a first respective distance to each of the others of the plurality of devices;
sharing the calculated first respective distances with the others of the plurality of devices;
autonomously calculating the centroid of the plurality of devices relative to the reference point based at least in part on the shared first respective distances without communicating the centroid to the others of the plurality of devices; and
wirelessly communicating a signal encrypted using the calculated centroid as a shared secret to at least one of the others of the plurality of devices;
wherein the at least one of the others of the plurality of devices has calculated the centroid based on the mutually identifiable plurality of devices.

10. The encryption method of claim 9, wherein the calculating of a first respective distance includes:
transmitting signals to the others of the plurality of devices, including a received signal level of a signal received by the others of the plurality of devices from the each of the plurality of devices; and
determining a distance between the each of the plurality of devices and the others of the plurality of devices based at least in part on the received signal levels received by the others of the plurality of devices, respectively.

11. The encryption method of claim 10, further comprising:
establishing an origin of the coordinate system as the reference point; and
determining, autonomously, the coordinate system including coordinates of the others of the plurality of devices relative to the origin based at least in part on the distance between the first device and the others of the plurality of devices;
wherein the calculating of the centroid of the system is based at least in part on the determined coordinates.

12. The encryption method of claim 9, further comprising:
receiving an order for the calculating of the first respective distance to each of the others of the plurality of devices in turn,
wherein the calculating of the first respective distance to each of the others of the plurality of devices is in the received order.

13. The encryption method of claim 12, wherein the sharing of the calculated first respective distances with the others of the plurality of devices is executed in the received order.

14. The encryption method of claim 9, wherein the identifying comprises:
developing an array of the calculated first respective distances between each of the plurality of devices and each of the others of the plurality of devices.

15. The encryption method of claim 9, further comprising:
periodically monitoring the first respective distances to the others of the plurality of devices.

16. The encryption method of claim 9, further comprising:
detecting a change in the distance between one of the each of the plurality of devices and one of the others of the plurality of devices;
recalculating the first respective distances to the others of the plurality of devices;
sharing the recalculated first respective distances with the others of the plurality of devices;
autonomously recalculating a centroid of the plurality of devices based at least in part on the shared recalculated first respective distances; and
wirelessly communicating using the recalculated centroid as a shared secret.

17. A non-transitory computer-readable medium storing executable instructions that, if executed, cause a computing component of a device to perform operations comprising:
autonomously calculating a centroid of a mutually identifiable plurality of devices of which the device is a part, based at least in part on first respective distances between the device and each of others of the plurality of devices and second respective distances between pairs of the others of the plurality of devices;
autonomously establishing the centroid as a shared secret without communicating the shared secret to the others of the plurality of devices; and
transmitting a wireless signal encrypted with the shared secret to at least one of the others of the plurality of devices;

wherein the at least one of the others of the plurality of devices has calculated the centroid based on the mutually identifiable plurality of devices.

18. The non-transitory computer-readable medium of claim 17, storing executable instructions that, if executed, cause the computing component of the device to perform operations further comprising:

calculating the first respective distances between the device and each of the others of the plurality of devices; and sharing the calculated first respective distances with the others of the plurality of devices.

* * * * *